(12) United States Patent
Lin

(10) Patent No.: US 11,228,072 B2
(45) Date of Patent: Jan. 18, 2022

(54) BATTERY BOX

(71) Applicant: Ling Yung Lin, Taipei (TW)

(72) Inventor: Ling Yung Lin, Taipei (TW)

(*) Notice: Subject to any disclaimer, the term of this patent is extended or adjusted under 35 U.S.C. 154(b) by 136 days.

(21) Appl. No.: 16/841,265

(22) Filed: Apr. 6, 2020

(65) Prior Publication Data

US 2021/0313550 A1    Oct. 7, 2021

(51) Int. Cl.
*H01M 50/256* (2021.01)
*H01R 13/52* (2006.01)
*H01M 50/20* (2021.01)
*H01M 50/172* (2021.01)
*H01M 50/24* (2021.01)

(52) U.S. Cl.
CPC ....... *H01M 50/256* (2021.01); *H01M 50/172* (2021.01); *H01M 50/20* (2021.01); *H01M 50/24* (2021.01); *H01R 13/5213* (2013.01)

(58) Field of Classification Search
None
See application file for complete search history.

(56) References Cited

U.S. PATENT DOCUMENTS

| 2005/0110456 A1* | 5/2005 | Jeong | H01M 10/4257 320/111 |
| 2012/0067914 A1* | 3/2012 | Sadler | B65D 43/164 220/810 |

* cited by examiner

*Primary Examiner* — Carmen V Lyles-Irving
(74) *Attorney, Agent, or Firm* — Rabin & Berdo, P.C.; Hui Zhang

(57) ABSTRACT

A battery box includes a box body composed of a housing and a lid. The box body has two opposite lateral sides provided respectively with a joining mechanism and a locking mechanism. A power source assembly is received in the box body and includes a circuit board, a power supply unit, and an external-connection cable. The joining mechanism allows the lid to be connected to the housing in a detachable and rotatable manner. The battery box can be switched to an operation mode that allows connection to an external power source device so as to adapt to modern application environments and provide more, and more convenient, operation modes.

14 Claims, 10 Drawing Sheets

BATTERY BOX

BACKGROUND OF THE INVENTION

1. Technical Field

The present invention relates to a power source device and more particularly to a battery box suitable for use with a decorative lighting product.

2. Description of Related Art

Development of the science of electricity has brought about the extensive use of electrical products in our daily lives. As electrical products vary, so do their power distribution design, which depends on the properties and applications of each product. For example, the power source assembly of an electric toy car or flashlight is integrated with the electrical product itself, whereas the power source assembly of such decorative or wide-coverage electrical products as festive light decorations and light strings is generally designed as an independent battery box to facilitate power supply in various environments where decoration is desired.

Common battery boxes on the market serve a single purpose only: to allow the battery or batteries in the box to function as a power source, i.e., to output electric energy during use, and be replaced or recharged when the electric energy is used up. A common battery box does not have more operation modes, let alone more convenient ones, to suit the various environments where it may be used. In addition, as the lid of a conventional battery box is pivotally provided on the box body, the angle to which the lid can be opened may limit the ease of battery replacement, and in terms of operation, force improperly applied to the lid tends to concentrate at the pivot shaft and thus damage or deform the pivot shaft assembly, impairing the tightness and waterproofness, if not shortening the service life, of the box.

BRIEF SUMMARY OF THE INVENTION

In view of the aforesaid drawbacks of the prior art, the present invention provides a battery box whose structural design enables not only detachment of the lid, but also power supply from multiple power sources so as to enhance convenience of use and provide plural operation modes suitable for modern application environments.

To achieve the aforesaid end, the battery box of the present invention essentially includes a box body, a waterproof ring, a joining mechanism, a locking mechanism, a power source assembly, and a connection hole. The boxy body includes a housing and a lid. The housing is provided with an opening and is concavely formed with a receiving space. The periphery of the opening forms a housing rim. The lid is detachably connected to the housing, is configured to cover the opening, and is provided with a lid rim that corresponds in position to and is configured to cover the housing rim. The waterproof ring is provided between the housing rim and the lid rim. The joining mechanism is provided on a lateral side of the box body and is configured to enable detachable connection of the lid to the housing and allow the lid to rotate about an axis defined by the joining mechanism to a closed position where the lid covers the opening. The locking mechanism is provided on the opposite lateral side of the box body with respect to the joining mechanism and is configured to fix the lid in position with respect to the housing when the lid is at the closed position.

The power source assembly is provided in the receiving space and includes a circuit board, a power supply unit, and an external-connection cable. The power supply unit and the external-connection cable are electrically connected to the circuit board individually. The connection hole is formed in a lateral side of the box body and is electrically connected to the power source assembly. In addition, the lid rim is concavely provided with a cable passage opening to allow passage of the external-connection cable, and the cable passage opening can be plugged with a waterproof plug when the external-connection cable is not passed through the cable passage opening.

The foregoing structures are preferably so designed that the waterproof plug extends from the waterproof ring.

The foregoing structures are preferably so designed that the housing rim is provided with a groove in which the waterproof ring is fitted, and that the lid rim is protrudingly provided with a flange corresponding in position to the groove and configured to press against the waterproof ring.

The foregoing structures are preferably so designed that the joining mechanism includes a positioning pivot shaft and a joining portion corresponding to the positioning pivot shaft, that the positioning pivot shaft is provided on an outer side of the housing and defines the axis about which the lid can be rotated, and that the joining portion is provided on an outer side of the lid and is configured to be connected to the positioning pivot shaft.

The foregoing structures are preferably so designed that a gap is provided between the positioning pivot shaft and the housing to allow passage of a portion of the joining portion.

The foregoing structures are preferably so designed that the joining portion is provided with a semicircular curved recess and can therefore be mounted around the positioning pivot shaft and rotated about the axis defined by the positioning pivot shaft.

The foregoing structures are preferably so designed that the locking mechanism includes a positioning projection and an extending projection engageable with the positioning projection; that the positioning projection is protrudingly provided on an outer side of the housing; and that the extending projection is L-shaped, is provided on an outer side of the lid, and extends to a position corresponding to the positioning projection so that when the lid is at the closed position, an end portion of the extending projection is engaged with the side of the positioning projection that faces away from the lid, thereby fixing the lid in position with respect to the housing.

The foregoing structures are preferably so designed that the waterproof ring is protrudingly provided with a connection cable position-limiting portion that corresponds in position to the cable passage opening and has a curved recess.

The foregoing structures are preferably so designed that the power supply unit is a battery receiving structure.

The foregoing structures are preferably so designed that one end of the external-connection cable is connected to the circuit board, and that the opposite end of the external-connection cable is provided with a Universal Serial Bus (USB) connector for connecting with an external power source device.

The foregoing structures are preferably so designed that the two ends of the external-connection cable are each provided with a USB connector, and that the two USB connectors can be connected to the circuit board and an external power source device respectively.

The foregoing structures are preferably so designed that the lid is provided with at least one waterproof button.

The foregoing structures are preferably so designed that the circuit board is located in the receiving space, corresponds in position to the waterproof button, and is provided with a post configured to abut against the waterproof button.

The foregoing structures are preferably so designed that a lateral side of the box body is provided with a hanging portion.

BRIEF DESCRIPTION OF THE SEVERAL VIEWS OF THE DRAWINGS

The effects, objectives, and technical features of the present invention can be better understood by referring to the following detailed description of some preferred embodiments in conjunction with the accompanying drawings, in which.

DETAILED DESCRIPTION OF THE INVENTION

Figure 1:
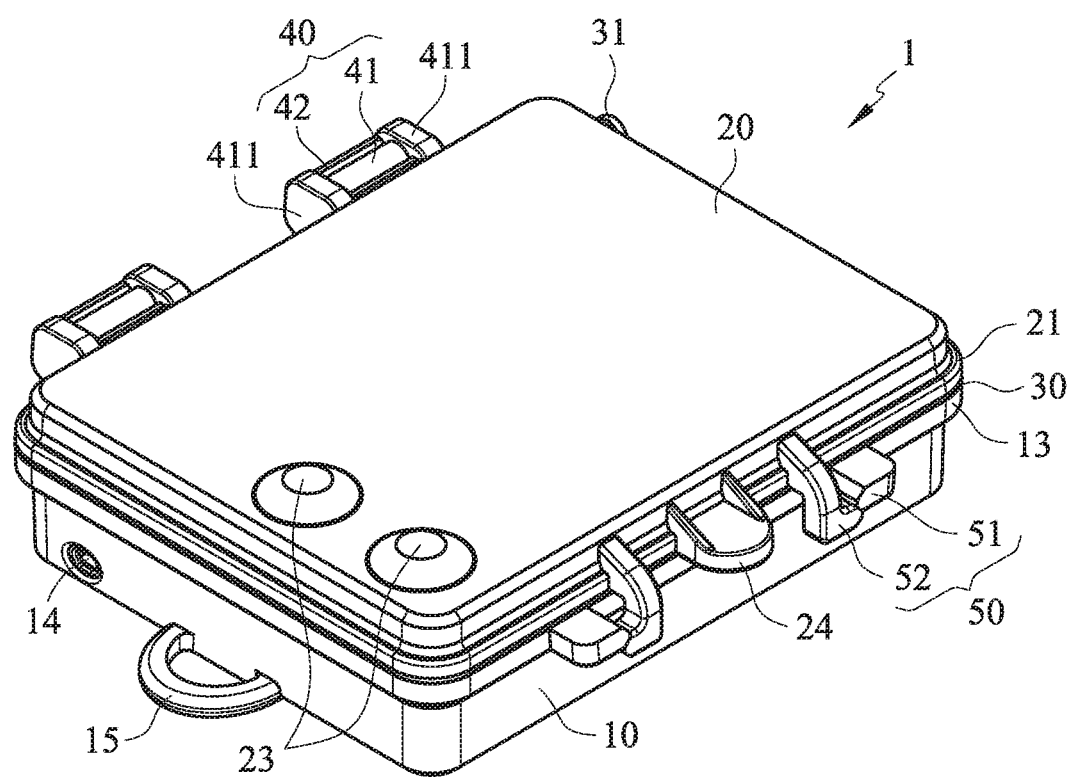
FIG. 1 is a perspective view of an embodiment of the invention and shows the embodiment in the closed state.
Figure 2:
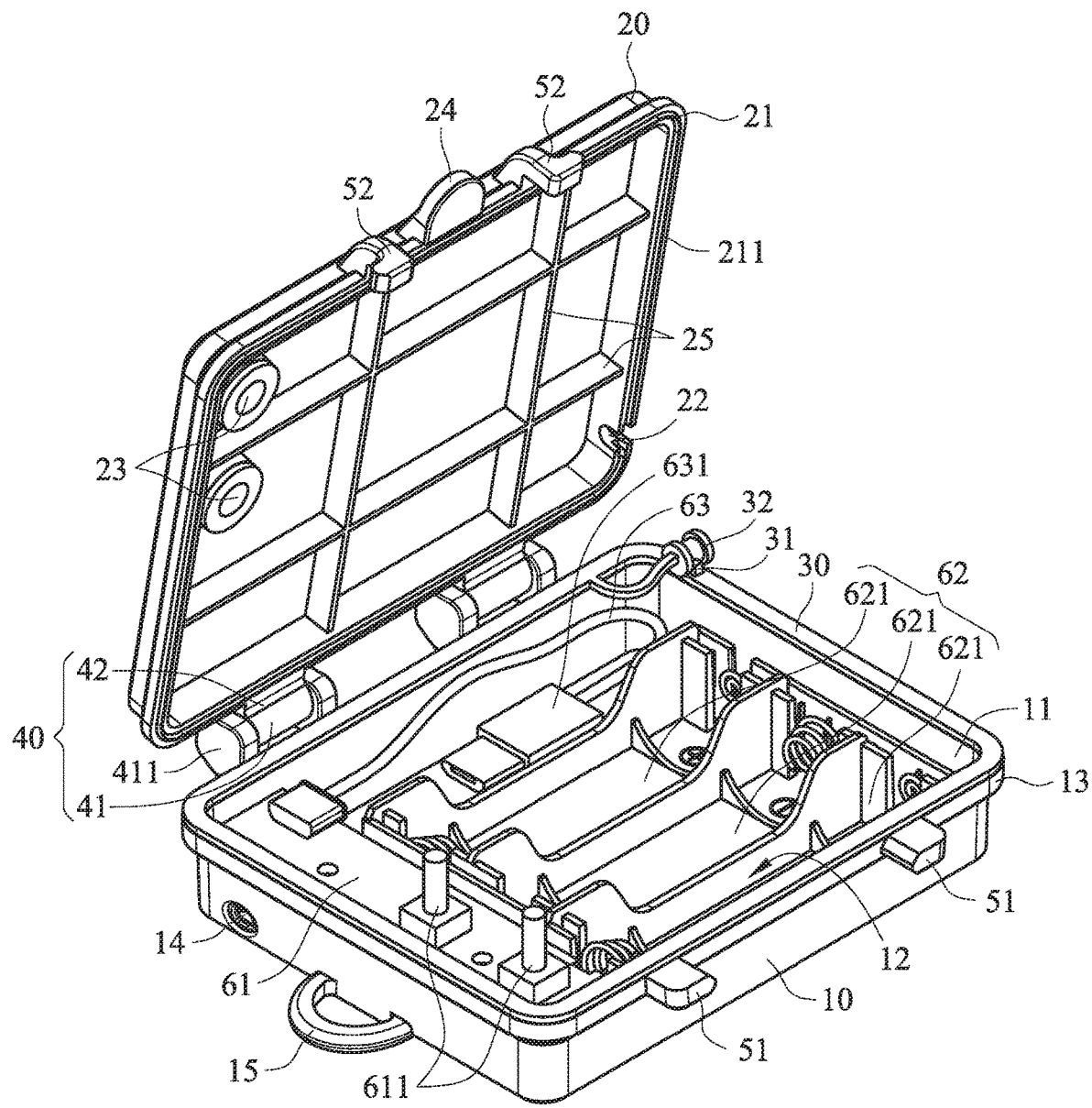
FIG. 2 is another perspective view of the embodiment in FIG. 1 and shows the embodiment in an opened state.
Figure 3:
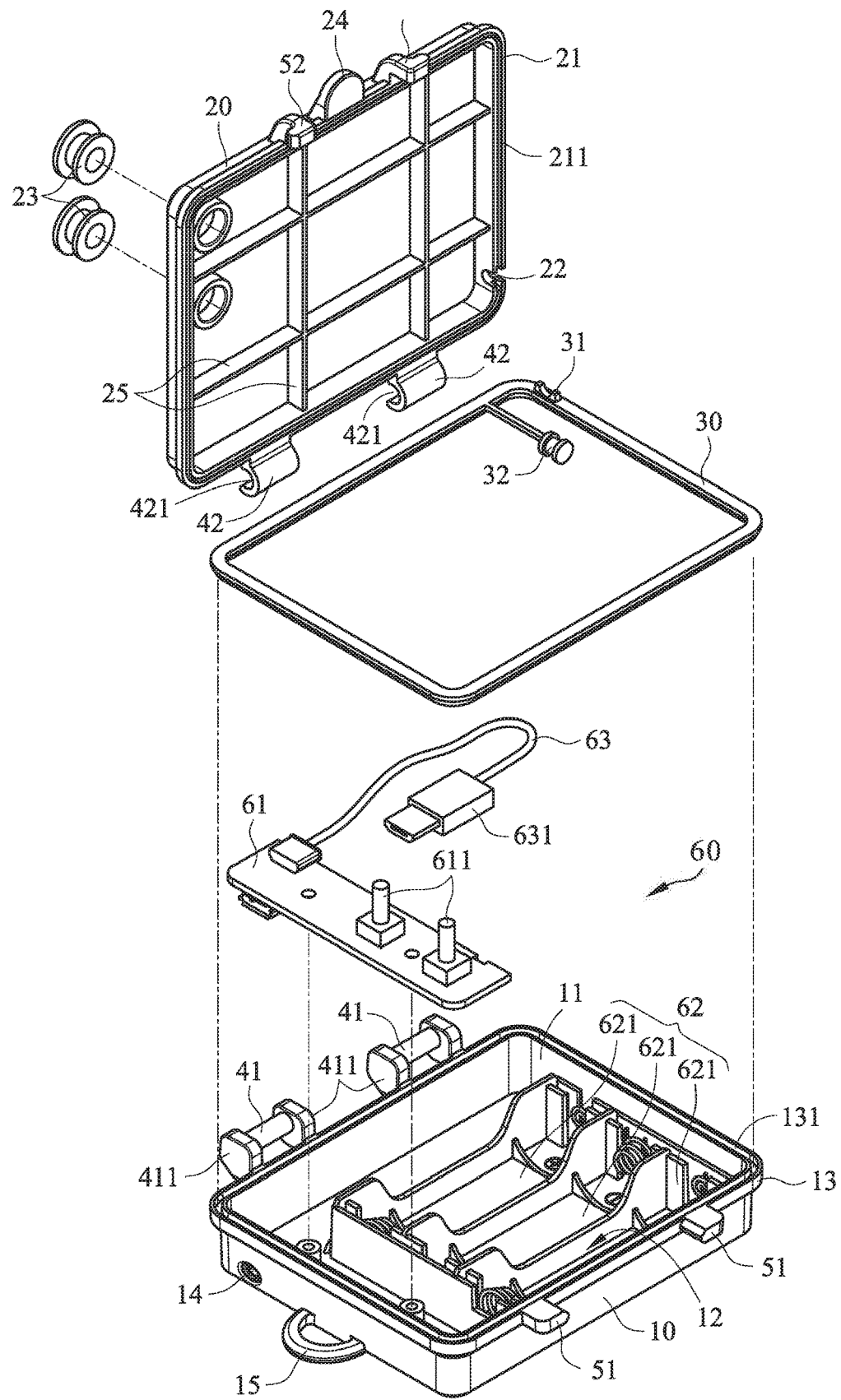
FIG. 3 is an exploded view of the embodiment in FIG. 1.

Referring to FIG. 1 to FIG. 3, the battery box according to an embodiment of the present invention includes a box body 1 that is composed of a housing 10 and a lid 20. The box body 1 is provided with a joining mechanism 40 and a locking mechanism 50 on two opposite sides respectively. The interior of the box body 1 is formed with a receiving space 12 for receiving a power supply assembly 60. A waterproof ring 30 is provided between the housing 10 and the lid 20 and can be clamped therebetween to form a watertight seal.

In this embodiment, the housing 10 is a rectangular structure including a bottom panel and a peripheral wall. The top side of the housing 10 forms an opening 11, and the receiving space 12 extends from the opening 11 into the housing 10. The top edge of the peripheral wall of the housing 10 (i.e., the periphery of the opening 11) is provided with a housing rim 13. The housing rim 13 is concavely provided with a groove 131 in which the waterproof ring 30 is fitted. One lateral side of the housing 10 is formed with a connection hole 14 configured to work with the power supply assembly 60 and is also formed with a hanging portion 15 with which the battery box can be hung.

The lid 20 corresponds in shape to the housing 10 and is configured to cover the opening 11 of the housing 10. In this embodiment, the lid 20 is detachable from the housing 10 and is connected to the housing 10 by the joining mechanism 40. The lid 20 is provided with a lid rim 21 corresponding in position to the housing rim 13. The lid rim 21 and the housing rim 13 can clamp the waterproof ring 30 between them so as to seal the opening 11 in a watertight manner The lid rim 21 is protrudingly provided with a flange 211 corresponding in position to the groove 131, in order for the flange 211 to apply a pressure on the waterproof ring 30 and thereby push the waterproof ring 30 into the groove 131 to achieve better waterproofness.

Figure 4:
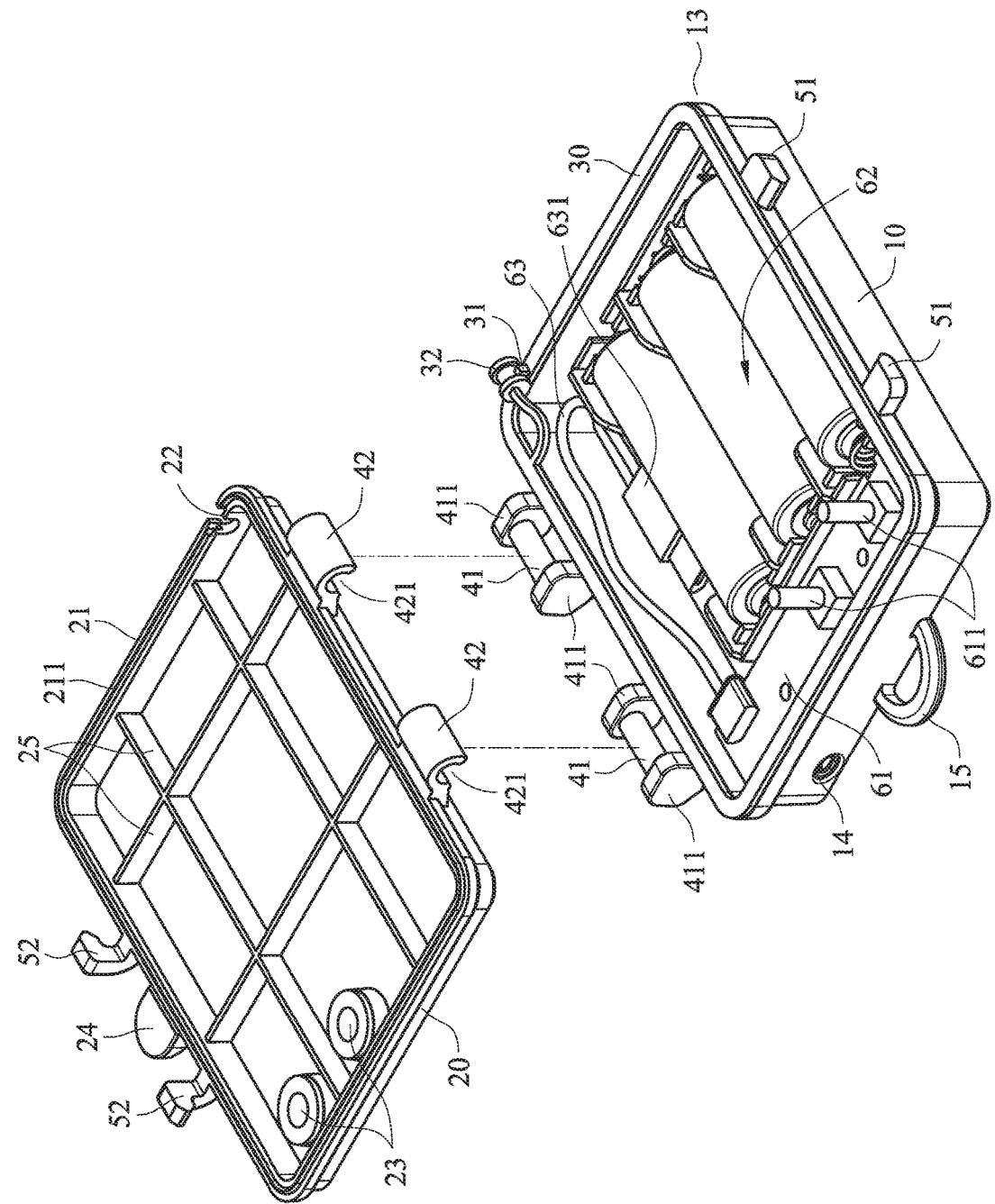
FIG. 4 is similar to FIG. 2 except that the lid is in the detached state.

Referring also to FIG. 4, the joining mechanism 40 is provided on a lateral side of the box body 1 and essentially includes a positioning pivot shaft 41 provided on an outer side of the housing 10 and a joining portion 42 provided on an outer side of the lid 20. The joining portion 42 is detachably connected to the positioning pivot shaft 41 such that the lid 20 is connected to the housing 10. The positioning pivot shaft 41 is provided on the aforesaid outer side of the housing 10 via a pair of supporting portions 411 so as to be parallel to the outer side of the housing 10 and form a gap between the positioning pivot shaft 41 and the housing 10, allowing a portion of the joining portion 42 to pass through the gap. The joining portion 42 protrudes from the aforesaid outer side of the lid 20 and corresponds in position to the positioning pivot shaft 41. The joining portion 42 is provided with a semicircular curved recess 421, and the curvature of the curved recess 421 matches the curvature of the positioning pivot shaft 41 so that by mounting the joining portion 42 around the positioning pivot shaft 41 (i.e., by placing the positioning pivot shaft 41 into the curved recess 421), the lid 20 is connected to the housing 10. The joining portion 42 can slide along the surface of the positioning pivot shaft 41 while staying in close contact with the surface of the positioning pivot shaft 41, and this allows the lid 20 to be rotated about an axis defined by the positioning pivot shaft 41 to a closed position where the lid 20 covers the opening 11 of the housing 10.

Figure 7:
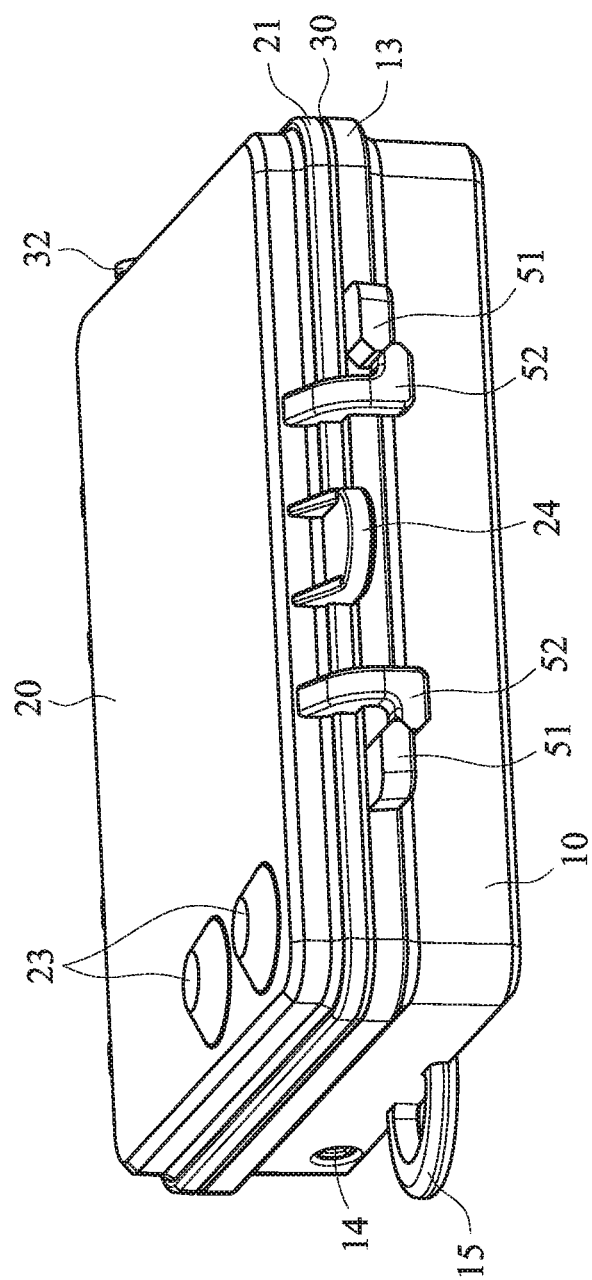
FIG. 7 is another perspective view of the embodiment in FIG. 1 and shows the embodiment in the closed state.

The locking mechanism 50 is provided on the opposite lateral side of the box body 1 with respect to the joining mechanism 40 and includes a positioning projection 51 and an extending projection 52 that are configured to engage with each other. The positioning projection 51 is protrudingly provided on an outer side of the housing 10. The extending projection 52 is L-shaped, is provided on an outer side of the lid 20, and extends to a position corresponding to the positioning projection 51. When the lid 20 is rotated toward the closed position, the extending projection 52 is brought into contact, and consequently engagement, with the positioning projection 51. As shown in FIG. 7, the contact surfaces of the positioning projection 51 and of the extending projection 52 are each formed with a conical protuberance, and thanks to the elasticity of the material of the extending projection 52, the free end portion of the extending projection 52 can move from one side to the other side of the positioning projection 51 (i.e., from the side of the positioning projection 51 that faces the lid 20 to the side facing away from the lid 20, the latter side hereinafter referred to as the second side of the positioning projection 51) and be engaged with the second side of the positioning projection 51, thereby fastening the lid 20 to the housing 10, with the opening 11 covered by the lid 20.

In one feasible embodiment of the present invention, the lid 20 is protrudingly provided with a pushing plate 24 next to the extending projection 52 so that the lid 20 can be easily moved by pushing the pushing plate 24.

Figure 5:
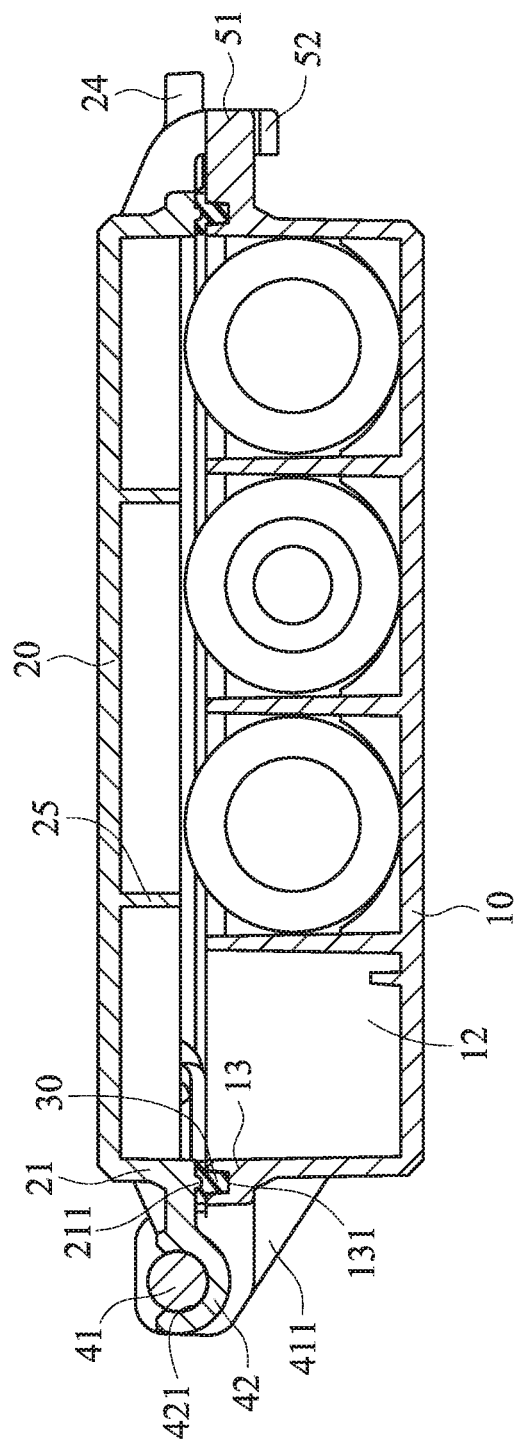
FIG. 5 is a sectional view of the embodiment in FIG. 1 and shows the embodiment in the closed state.

To assemble the battery box, referring to FIG. 4, the joining portion 42 on the lid 20 is mounted around the positioning pivot shaft 41 at an appropriate angle (i.e., the positioning pivot shaft 41 is placed into the curved recess 421 of the joining portion 42 at an appropriate angle) such that the joining portion 42 can move along the surface of the positioning pivot shaft 41, i.e., the lid 20 can be rotated about the axis defined by the positioning pivot shaft 41 (see FIG. 2). Once the lid 20 is rotated to the closed position as shown in FIG. 1, the free end portion of the extending projection 52 is engaged with the second side of the positioning projection 51, and the lid 20 presses tightly against the waterproof ring 30 and covers the housing 10 as a result. When at the closed position, referring to FIG. 5 and FIG. 6, the waterproof ring 30 is tightly clamped between the lid rim 21 and the housing rim 13, with the bottom edge of the waterproof ring 30 engaged in the groove 131 of the housing rim 13, and the top edge of the waterproof ring 30 pressed by the flange 211 protruding from the lid rim 21.

The power source assembly 60 includes a circuit board 61, a power supply unit 62, and an external-connection cable 63, all provided in the receiving space 12. In this embodiment, the power supply unit 62 is a plurality of battery receiving structures 621 that are electrically connected in series or parallel, and that take up a relatively large portion, and are disposed at a corner, of the receiving space 12, while the remaining portion of the receiving space 12 forms a transverse duct where the circuit board 61 is mounted and a longitudinal duct where the external-connection cable 63 is placed. The power supply unit 62 and the external-connection cable 63 are electrically connected to the circuit board 61 individually. The circuit board 61 is provided with an insertion slot corresponding to the connection hole 14.

In this embodiment, the side of the lid rim 21 that corresponds in position to the external-connection cable 63 is concavely provided with a cable passage opening 22, and the external-connection cable 63 can be passed through the cable passage opening 22 in order to connect with an external power supply. In addition, the waterproof ring 30 is protrudingly provided with a connection cable position-limiting portion 31 corresponding in position to the cable passage opening 22, and the middle section of the connection cable position-limiting portion 31 forms a curved recess to help position the external-connection cable 63. Moreover, the inner side of the waterproof ring 30 is provided, or more particularly extended, with a waterproof plug 32. The waterproof plug 32 can be fitted into the cable passage opening 22 while the external-connection cable 63 is not in use (i.e., while the external-connection cable 63 is not passed through the cable passage opening 22).

Figure 6:
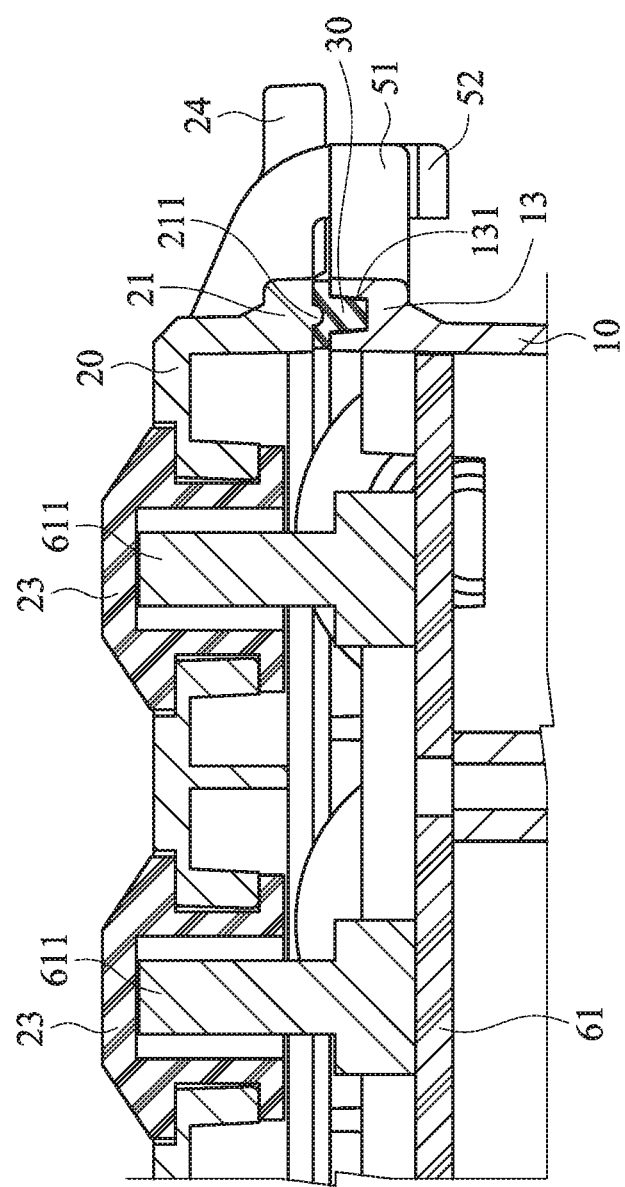
FIG. 6 is a sectional view of the waterproof buttons of the embodiment in FIG. 1.

Referring also to FIG. 4 and FIG. 6, the lid 20 is provided with two waterproof buttons 23 corresponding in position to the circuit board 61, and the circuit board 61 is provided with two posts 611 that correspond in position to and are configured to abut against the two waterproof buttons 23 respectively. The waterproof buttons 23 and the posts 611 are intended to enable and facilitate various switching operations (e.g., turning power on and off).

Figure 8:
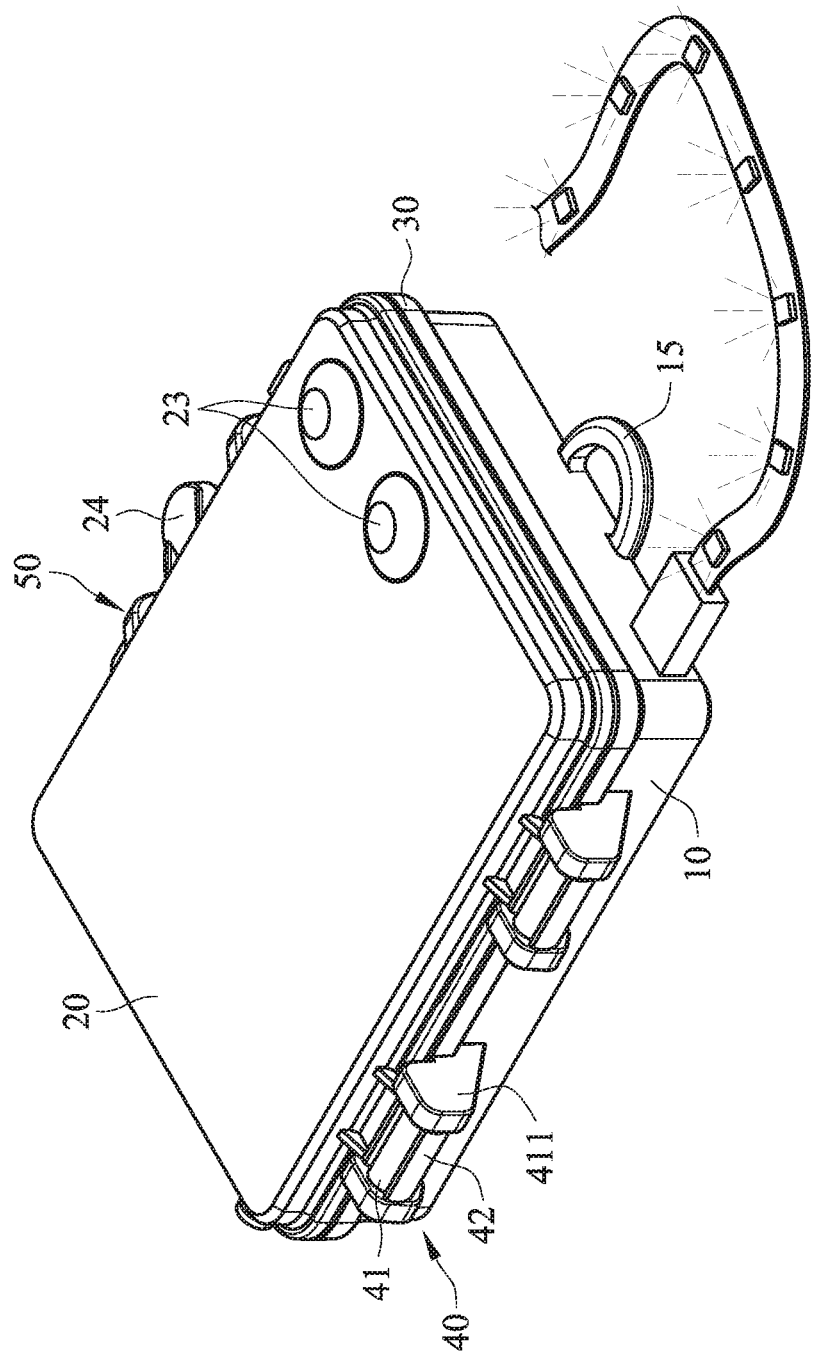
FIG. 8 shows a state of use of the embodiment in FIG. 1.

In terms of use, referring to FIG. 8, the batteries in the power supply unit 62 can be directly used to power an external electrical product connected to the connection hole 14, such as the decorative light string shown in FIG. 8. Or, referring to FIG. 9, the external-connection cable 63 can be passed through the cable passage opening 22 and connected to an external power supply in the environment where the battery box is used, and in that case, the battery box can be switched to an external-connection cable 63-based power supply mode by operating the waterproof buttons 23. Thus, the battery box can be used in more, and more convenient, ways than its prior art counterparts.

Figure 9:
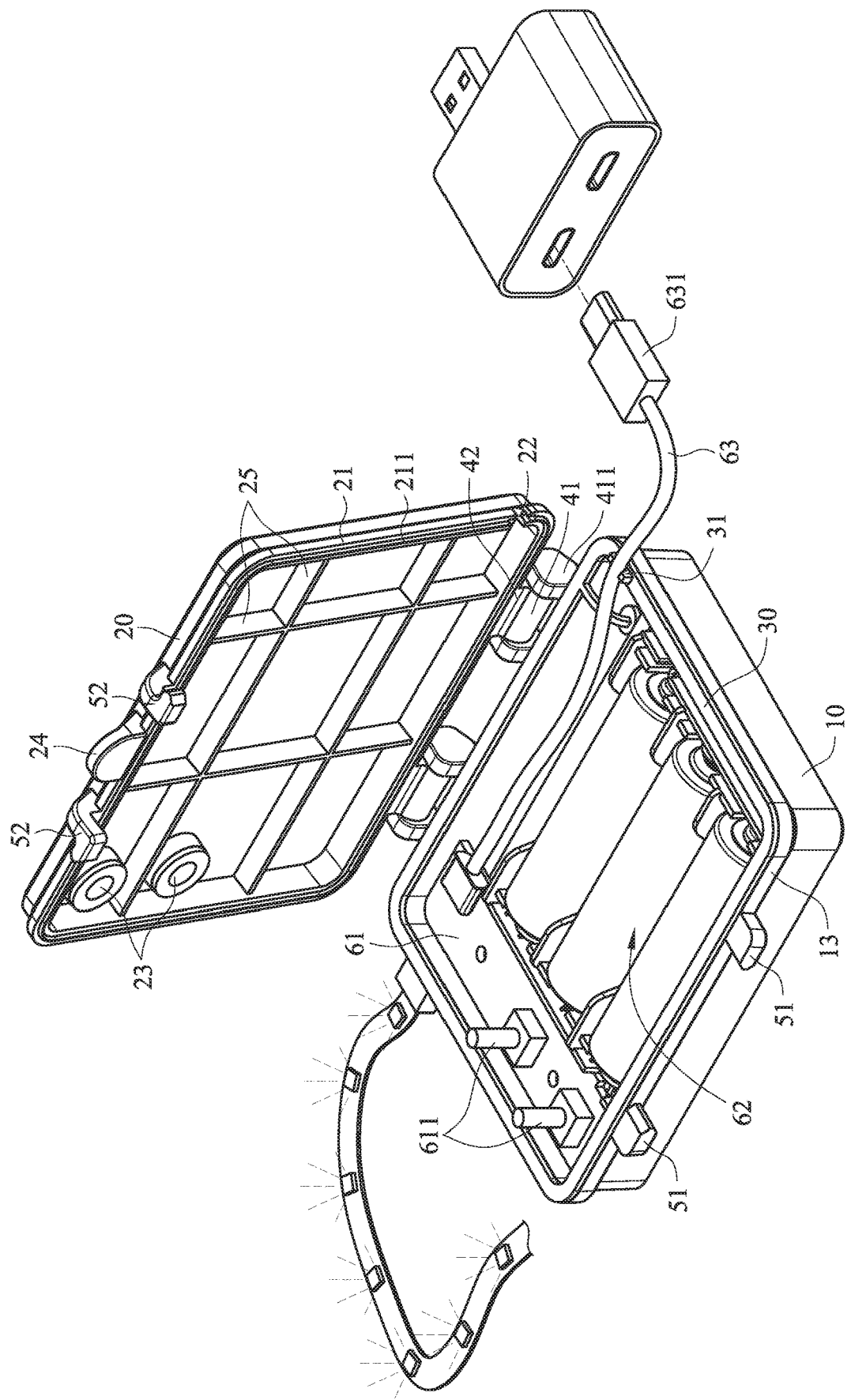
FIG. 9 shows another state of use of the embodiment in FIG. 1.
Figure 10:
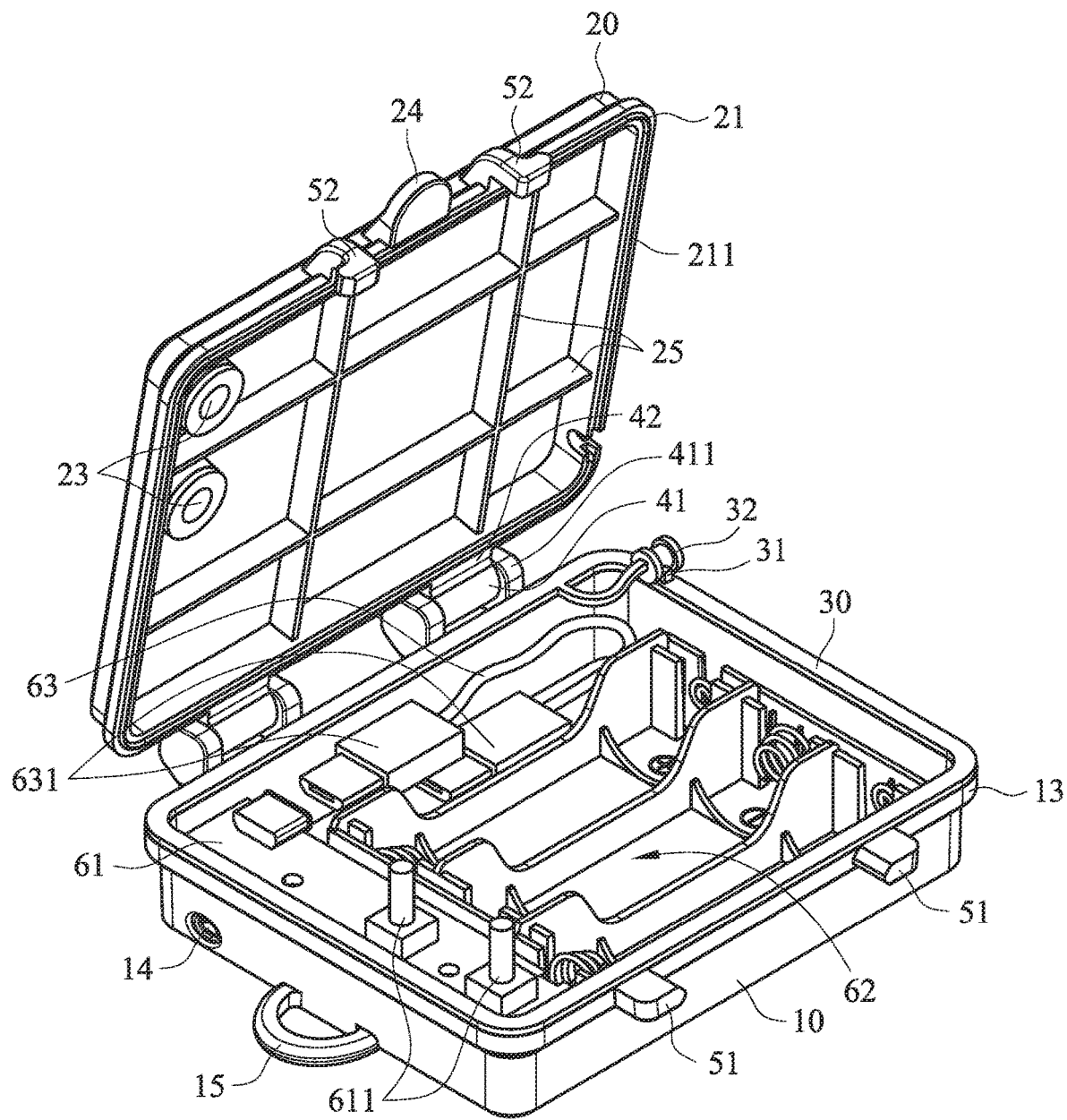
FIG. 10 is a perspective view of another embodiment of the invention.

In one feasible embodiment of the present invention, the external-connection cable 63 is a connection cable directly connected to the circuit board 61 as shown in FIG. 9, with its free end configured as a USB connector 631, which is now a common connector between electrical products. Of course, each of the two ends of the external-connection cable 63 may be configured as a USB connector 631 instead, as shown in FIG. 10, in which case the external-connection cable 63 can be folded up and stored in a reserved portion of the receiving space 12 while not in use, and be put to use by connecting one of the USB connectors 631 to the preinstalled insertion slot on the circuit board 61, passing the external-connection cable 63 through the cable passage opening 22, and connecting the other USB connector 631 to an external power supply. It is worth mentioning that the external-connection cable 63 can be provided with USB connectors of different specifications to meet practical needs and enable even more diversified and more convenient use.

The embodiments described above are only some preferred ones of the present invention. Any extension, modification, simple change, or equivalent substitution based on the technical means of the invention shall fall within the scope of the invention.

What is claimed is:

1. A battery box, comprising:
   a box body including a housing and a lid, wherein the housing is provided with an opening and is concavely formed with a receiving space, the opening has a periphery forming a housing rim, the lid is detachably connected to the housing and is configured to cover the opening, and the lid is provided with a lid rim corresponding in position to and configured to cover the housing rim;
   a waterproof ring provided between the housing rim and the lid rim;
   a joining mechanism provided on a lateral side of the box body and configured to detachably connect the lid to the housing in such a way that the lid is rotatable about an axis defined by the joining mechanism to a closed position where the lid covers the opening;
   a locking mechanism provided on an opposite lateral side of the box body with respect to the joining mechanism and configured to fix the lid in position with respect to the housing when the lid is at the closed position;
   a power source assembly provided in the receiving space and including a circuit board, a power supply unit, and an external-connection cable, wherein the power supply unit and the external-connection cable are electrically connected to the circuit board individually; and
   a connection hole formed in a lateral side of the box body and electrically connected to the power source assembly;
   wherein the lid rim is concavely provided with a cable passage opening to allow passage of the external-connection cable, and the cable passage opening is pluggable with a waterproof plug when the external-connection cable is not passed through the cable passage opening.

2. The battery box of claim 1, wherein the waterproof plug extends from the waterproof ring.

3. The battery box of claim 1, wherein the housing rim is provided with a groove in which the waterproof ring is fitted, and the lid rim is protrudingly provided with a flange corresponding in position to the groove and configured to press against the waterproof ring.

4. The battery box of claim 1, wherein the joining mechanism includes a positioning pivot shaft and a joining portion corresponding to the positioning pivot shaft, the positioning pivot shaft is provided on an outer side of the housing, the positioning pivot shaft defines the axis about which the lid is rotatable, the joining portion is provided on an outer side of the lid, and the joining portion is configured to be connected to the positioning pivot shaft.

5. The battery box of claim 4, wherein there is a gap between the positioning pivot shaft and the housing to allow passage of a portion of the joining portion.

6. The battery box of claim 5, wherein the joining portion is provided with a semicircular curved recess to enable the joining portion to be mounted around the positioning pivot shaft and rotate about the axis defined by the positioning pivot shaft.

7. The battery box of claim 1, wherein the locking mechanism includes a positioning projection and an extending projection engageable with the positioning projection, the positioning projection is protrudingly provided on an outer side of the housing, and the extending projection is L-shaped, is provided on an outer side of the lid, and extends to a position corresponding to the positioning projection so that when the lid is at the closed position, an end portion of the extending projection is engaged with a side of the positioning projection that faces away from the lid, thereby fixing the lid in position with respect to the housing.

8. The battery box of claim 1, wherein the waterproof ring is protrudingly provided with a connection cable positioning-limiting portion corresponding in position to the cable passage opening and having a curved recess.

9. The battery box of claim 1, wherein the power supply unit is a battery receiving structure.

10. The battery box of claim 1, wherein the external-connection cable has one end connected to the circuit board and an opposite end provided with a Universal Serial Bus (USB) connector for connecting with an external power source device.

11. The battery box of claim 1, wherein the external-connection cable has two ends each provided with a Universal Serial Bus (USB) connector, and the two USB connectors are connectable to the circuit board and an external power source device respectively.

12. The battery box of claim 1, wherein the lid is provided with at least one waterproof button.

13. The battery box of claim 12, wherein the circuit board is located in the receiving space at a position corresponding to the waterproof button and is provided with a post configured to abut against the waterproof button.

14. The battery box of claim 1, wherein the box body has a lateral side provided with a hanging portion.

* * * * *